United States Patent
Karstens

(10) Patent No.: US 8,359,437 B2
(45) Date of Patent: Jan. 22, 2013

(54) VIRTUAL COMPUTING MEMORY STACKING

(75) Inventor: Christopher K. Karstens, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1289 days.

(21) Appl. No.: 12/119,544

(22) Filed: May 13, 2008

(65) Prior Publication Data

US 2009/0287886 A1 Nov. 19, 2009

(51) Int. Cl.
*G06F 12/00* (2006.01)

(52) U.S. Cl. ........... 711/147; 711/203; 711/E12.068; 718/1

(58) Field of Classification Search ............ 711/203, 711/147, E12.001, E12.064, E12.065, E12.068; 718/1
See application file for complete search history.

(56) References Cited

U.S. PATENT DOCUMENTS

| | | | |
|---|---|---|---|
| 4,727,510 A | 2/1988 | Scheuneman et al. | |
| 5,014,247 A | 5/1991 | Albachten, III et al. | |
| 5,884,067 A | 3/1999 | Storm et al. | |
| 6,393,545 B1 | 5/2002 | Long et al. | |
| 6,496,882 B2 | 12/2002 | Iverson | |
| 6,564,305 B1 | 5/2003 | Moore | |
| 2004/0123290 A1* | 6/2004 | Overton et al. | 718/1 |
| 2007/0028056 A1 | 2/2007 | Harris | |
| 2009/0119361 A1 | 5/2009 | Burckart et al. | |
| 2009/0177871 A1* | 7/2009 | Von Praun et al. | 712/226 |

* cited by examiner

*Primary Examiner* — Pierre-Michel Bataille
(74) *Attorney, Agent, or Firm* — Marcia L. Doubet

(57) ABSTRACT

Virtual stacking is utilized in a virtual machine environment by receiving a data element for storage to a shared memory location and writing to the shared memory location. Writing to the shared memory location may be implemented by reading the shared memory location contents, encoding the received data element with the shared memory location contents to derive an encoded representation and writing the encoded representation to the shared memory location so as to overwrite the previous shared memory location contents. The method may further comprise receiving a request for a desired data element encoded into the shared memory location, decoding the shared memory location contents until the desired data element is recovered and communicating the requested data element.

20 Claims, 9 Drawing Sheets

VIRTUAL COMPUTING MEMORY STACKING

BACKGROUND OF THE INVENTION

The present invention relates to systems, computer-implemented methods and computer program products for stacking virtual memory.

A "virtual machine" may be though of as a "virtual" (software) implementation of a physical processing device. As an example, a computer may be partitioned into many independent virtual machines, each capable of supporting and executing its own operating system and applications. While the sharing and virtualization techniques used to create one or more virtual machines on a physical computer present an efficient use of hardware resources, it may also create various challenges for operating efficiency. As an example, all of the virtual machines must share the physical resources including the available memory of the host physical processing device. If the memory demands for the various executing virtual machines exceed the physical capabilities of the host system, then memory swapping to hard drive space occurs resulting in poor virtual machine performance.

BRIEF SUMMARY OF THE INVENTION

According to aspects of the present invention, a method of utilizing physical memory in a virtual machine environment comprises receiving a data element for storage to a shared memory location and writing a representation of the data element to the shared memory location. As used herein, the term "data element" should be interpreted broadly to include any form of data that is to be written to a memory location as part of a write operation initiated by a virtual machine, or any form of data that is to be read from a memory location as part of a read operation initiated by an associated virtual machine.

Writing to the shared memory location may be implemented by reading the shared memory location contents, encoding the received data element with the shared memory location contents to derive an encoded representation and writing the encoded representation to the shared memory location so as to overwrite the previous shared memory location contents. The method may further comprise receiving a request for a desired data element encoded into the shared memory location, decoding the shared memory location contents until the desired data element is recovered and communicating the requested data element.

According to further aspects of the present invention, a method of utilizing physical memory in a virtual machine environment comprises associating a plurality of virtual machines with a physical memory having a shared memory area, receiving a data element from a first virtual machine and performing a first write operation to write the data element to a shared memory location within the shared memory area. The write operation may be performed by reading shared memory location contents, encoding the data element with the shared memory location contents to derive an encoded representation, writing the encoded representation to the shared memory location so as to overwrite the previous content and updating a stack to track information to decode writes to the shared memory location.

The method may still further comprise receiving a request for a desired data element encoded into the shared memory location, reading down the stack to obtain the information necessary to decode the shared memory location contents until the desired data element is recovered, associating the desired data element with a corresponding virtual machine that communicated the desired data element for storage at the shared memory location and communicating the requested data element to the corresponding virtual machine.

According to still further aspects of the present invention, a system for managing physical memory comprises a physical processing device having a plurality of virtual machines executing thereon, a physical memory having a shared memory area and a virtual manager. The virtual manager is configured to receive a data element for storage to the shared memory location and write to the shared memory location by reading the shared memory location contents, encoding the received data element with the shared memory location contents to derive an encoded representation and writing the encoded representation to the shared memory location so as to overwrite the previous shared memory location contents. The virtual manager is further configured to utilize a stack to track each time a different received data element is encoded with the shared memory location contents, receive a request for a desired data element encoded into the shared memory location, decode the shared memory location contents until the desired data element is recovered and communicate the requested data element.

DETAILED DESCRIPTION OF THE INVENTION

According to various aspects of the present invention, memory stacking is utilized in a virtual environment. As will be described in greater detail herein, a virtual manager interacts with virtual machines to manage read and write operations between the virtual machines and a corresponding shared physical memory. If two or more virtual machines attempt to write to or read from the same physical memory location, the virtual manager implements a memory stacking operation that performs encoding and/or decoding of the information provided from each virtual machine so as to manage the physical memory space in a manner that reduces the need to swap physical memory contents to hard drive storage.

Figure 1:
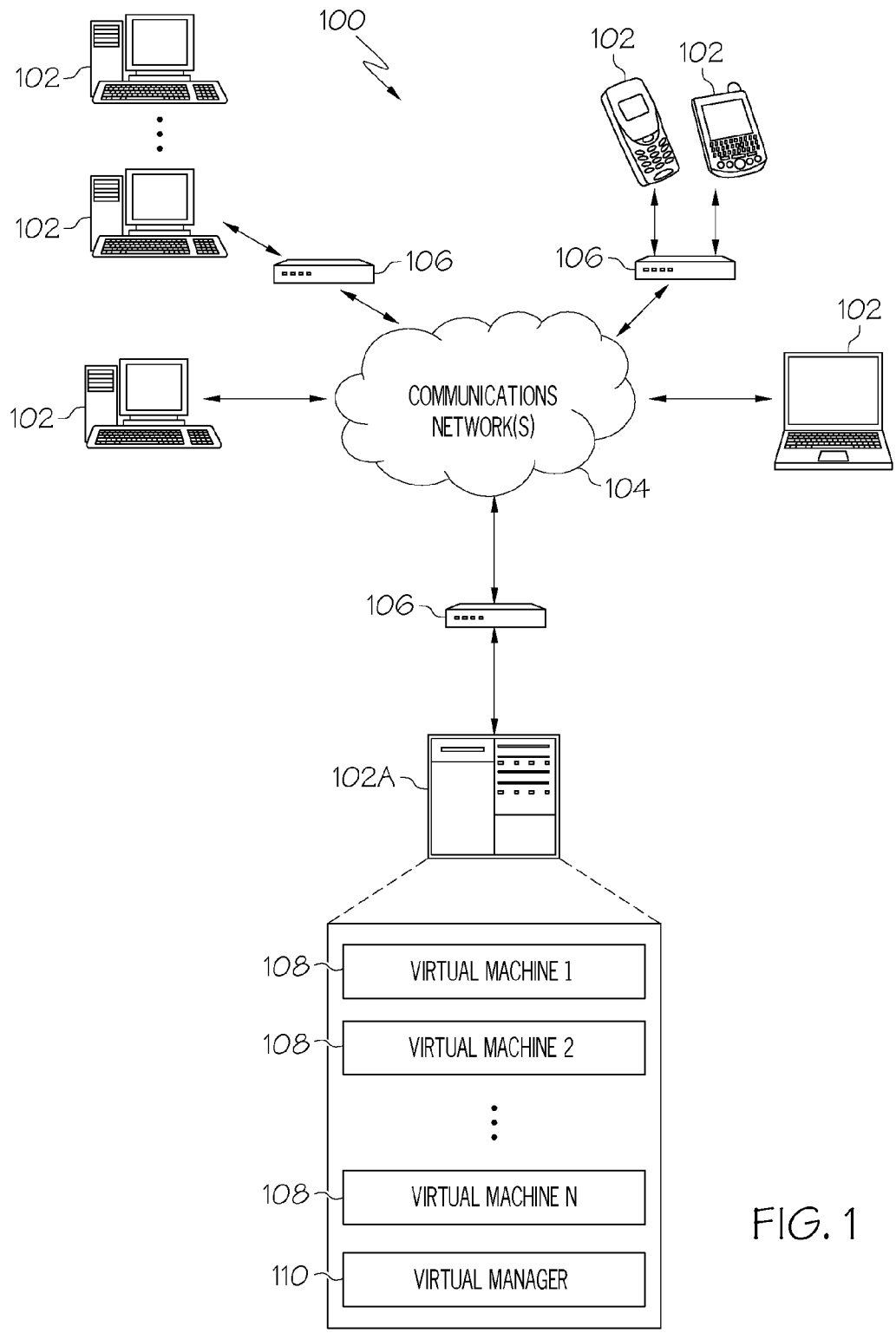
FIG. 1 is a schematic illustration of an exemplary system in which virtual computing memory stacking may be implemented according to various aspects of the present invention.

Referring now to the drawings and particularly to FIG. 1, a general diagram of an exemplary computing environment is illustrated. The environment 100 comprises a plurality of processing devices, designated in general by the reference numeral 102, that are linked together by a network 104. Typical processing devices 102 may include servers, personal computers, notebook computers, transactional systems, appliance or pervasive computing devices such as a personal data assistant (PDA), palm computers, cellular access processing devices, special purpose computing devices, printing and imaging devices, facsimile devices, storage devices and/or other devices capable of communicating over the network 104.

The network 104 provides communications links between the various processing devices 102, and may be supported by networking components 106 that interconnect the processing devices 102, including for example, routers, switches, hubs, firewalls, network interfaces, wired or wireless communications links, and corresponding interconnections. Moreover, the network 104 may comprise connections using one or more intranets, extranets, local area networks (LAN), wide area networks (WAN), wireless networks (WIFI), the internet, including the world wide web, and/or other arrangements for enabling communication between the processing devices 102, in either real time or otherwise, e.g., via time shifting, batch processing, etc.

In the exemplary environment 100, one or more of the processing devices 102, which are further designated by the reference numeral 102A, may support one or more virtual machines 108. As an example, the processing device 102A may comprise a zSeries® mainframe by International Business Machines Corporation (IBM®) of Armonk, N.Y. ("zSeries" and "IBM" are registered trademarks of International Business Machines Corporation in the United States, other countries, or both.)

Each virtual machine 108 may comprise an allocation of the processor(s), memory, storage and/or other capabilities and physical resources of the host processing device 102A sufficient to define and operate a virtual machine that appears and behaves like an independent physical computing device.

In this regard, each virtual machine 108 may include a virtualized processor, communications, storage, networking, and input/output (I/O) resources, etc., and is capable of executing, for example, an operating system instance and corresponding applications and servers that interact with various databases, spreadsheets, structured documents, unstructured documents and/or other files containing information. The processing device 102A further comprises a virtual manager 110, which may be utilized to implement virtual computing memory stacking as set out more fully herein. Thus for example, if the plurality of virtual machines 108 each implement an instance of server software, it may appear that there are N independent servers available across the network 104 despite the fact that all N virtual servers reside on the same physical hardware.

The depicted exemplary computing environment is not meant to imply architectural limitations with respect to the present invention. Moreover, the above configuration is shown by way of illustration and not by way of limitation. As such, other processing system configurations may be implemented. For example, a network 104, network connection or other form of multi-processing device environment is not required to practice various aspects of the present invention.

Figure 2:
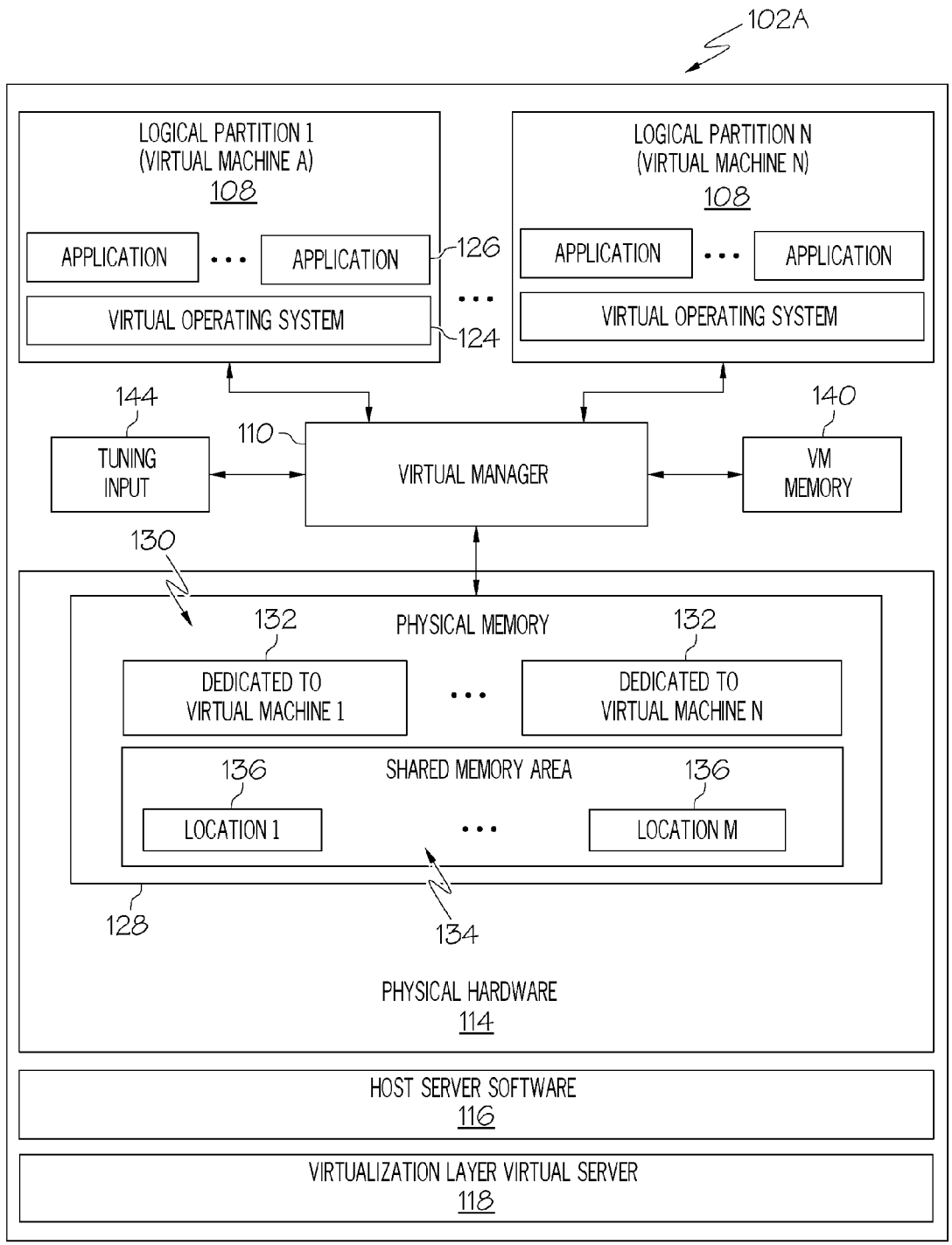
FIG. 2 is a block diagram of a virtual manager for implementing memory stacking according to various aspects of the present invention.

With reference to FIG. 2, the illustrative processing device 102A comprises physical hardware 114, which may include at least one physical network adapter for communicating across the network 104, one or more processors, physical memory, hard drive storage, I/O devices and/or other components associated with physical processing devices as will be described in greater detail herein. The processing device 102A may also include host server software 116 and a virtualization layer virtual server layer 118 or other suitable software/hardware that enables the processing device 102A to support the multiple logical partitions, e.g., virtual machines 108. As noted above, each virtual machine 108 in general, may look and behave like a traditional hardware/software server in the illustrative example, and may thus implement a virtual hardware layer that includes at least one communication protocol stack, e.g., an IP stack, a virtual operating system layer 124 for executing an appropriate operating system, and one or more applications 126.

The virtualization layer virtual server layer 118 may be configured to maximize hardware usage levels among the various virtual machines 108. However, insufficient physical memory requires memory swapping to the hard drive, which may impose performance penalties on the virtual machines 108 and/or corresponding host processing device 102A. As an example, computing memory speed is often described in nanoseconds (ns). Thus, a conventional random access memory (RAM) may define an average access time on the order of 10 ns or faster. Correspondingly, conventional hard drive speed is often described in terms of milliseconds (ms). Thus, a conventional hard drive may have an average access time of 10 ms. Accordingly, in a system with the exemplary computer memory and exemplary hard drive, if the system has to swap memory to hard drive space, a significant performance penalty will be imposed as there are 1,000,000 ns per 1 ms.

However, according to various aspects of the present invention, the virtual manager 110 may be utilized to mitigate performance penalties typically imposed on systems due to memory constraints by implementing memory stacking in the virtual environment, e.g., by managing a memory area 128 of the physical storage of the processing device 102A, which may result in significant reduction in memory swapping to the hard drive. In this regard, the virtual manager 110 may reside in software, e.g., within the host server software 116, virtualization layer virtual server layer 118 or elsewhere in software supported by the processing device 102A, within hardware, e.g., within the physical hardware layer 114, or in a combination of hardware and software.

Each of the virtual machines 108 may communicate with the virtual manager 110 for managing read and write operations to the physical memory 128. In the illustrative example, the physical memory 128 has been conceptually divided up into two main regions. A first region 130 comprises a plurality of designated memory areas 132. Each designated area may be allocated to an associated virtual machine 108 so that each of the corresponding virtual machines 108 may have a dedicated memory space. The illustrated physical memory also comprises a shared memory area 134. The shared memory area comprises a plurality of shared memory locations 136 where data elements may be written by any of the virtual machines 108. As used herein, the term "data element" should be interpreted broadly to include any form of data that is to be written to a memory location as part of a write operation initiated by a virtual machine 108, or any form of data that is to be read from a memory location as part of a read operation initiated by an associated virtual machine 108.

By way of illustration and not by way of limitation, assume that the physical memory 128 has 20 gigabytes (GB) of available storage for use by the various associated virtual machines 108. Further, assume that there are four virtual machines 108 associated with the processing device 102A, designated VM-A, VM-B, VM-C and VM-D. Still further, assume that each virtual machine VM-A, VM-B, VM-C and VM-D requires 16 GB of memory, such that there is a total virtual demand for memory of 64 GB.

Thus, the virtual manager 110 hosts the four virtual machines 108 by managing the 64 GB of memory demanded by the four virtual machines 108 and by managing the 20 GB of available physical memory. For purposes of illustration, assume that 1 GB of memory is dedicated to each virtual machine 108, e.g., for the most immediate needs of the processes implemented by the virtual machine 108. Thus, the virtual manager 110 may allocate 1 GB within the 20 GB of physical memory as dedicated memory 132 for use by each of the virtual machines 108.

In this regard, the 1 GB dedicated memory 132 need not reside in contiguous blocks of memory per se nor does it have to reside in any particular location. Rather, any desired memory management techniques can be utilized to manage the physical memory such that a total of 1 GB of memory is always available to each of the four (in this example) virtual machines 108 without requiring any intervening memory location encoding or decoding by the virtual manager 110. The remaining 16 GB of physical memory may comprise, for example, a designated shared memory area 134 that may be utilized by the virtual manager 110 to store information for any of the virtual machines e.g., where a given virtual machine 108 has a memory demand that exceeds its allotted 1 GB in the present example. As such, each of the shared memory locations 136 comprises a location within the shared memory area 134 where data may be stored for one or more virtual machines 108. As will be described more fully herein, each of the shared memory locations 136 may also be utilized to store data that encodes data elements of two or more virtual machines 108.

The virtual manager 110 may also utilize memory 140, which may be part of the main system memory or other memory allocated to the virtual manager environment. In this regard, the virtual manager 110 may utilize the memory 140 to maintain one or more stacks, pointers or other mechanisms to perform memory stacking as set out herein.

Figure 3:
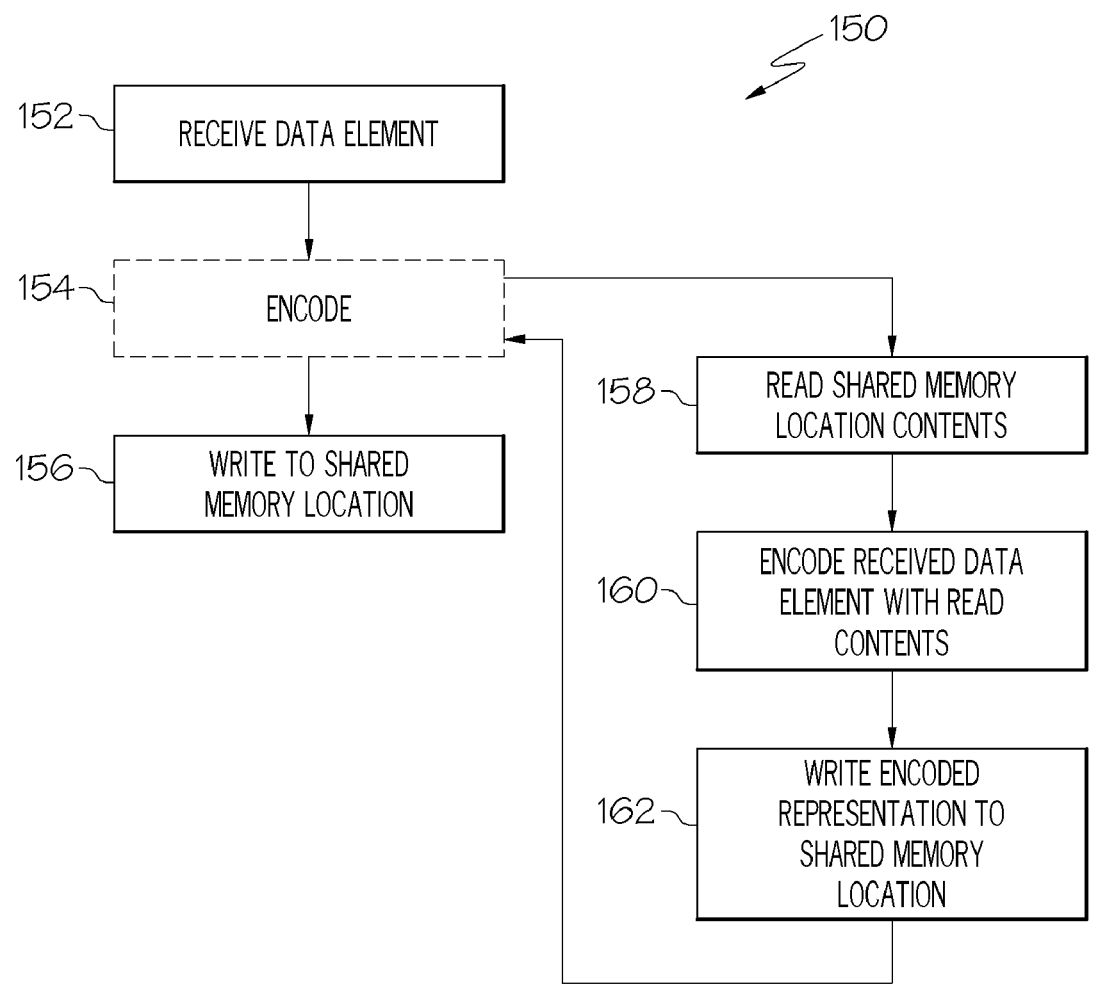
FIG. 3 is a flow chart illustrating a method for managing memory transactions such as write operations using memory stacking according to various aspects of the present invention.

Referring to FIG. 3, a flow chart illustrates a method 150 that describes a general approach for managing memory transactions such as write operations using memory stacking. The method 150 may be implemented, for example, by the virtual manager 110 interacting with one or more virtual machines 108 and the memory 128. A data element is received at 152 for storage within a physical memory device.

The data element may be encoded at 154 and the data element (or encoded representation corresponding to the data element) is written to a memory location within a shared area of a physical memory at 156, e.g., a memory location 136 within the shared area 134 of physical memory 128 as illustrated in FIG. 2. Assuming that the received data element is the first data element to be written to a corresponding shared memory location, a determination may be made to not encode the first data element. Rather, the first data element may be written directly to the intended memory location. Alternatively, encoding of the first data element to be written to a shared memory location may be useful, for example, to simplify the memory stacking algorithms. However, for write operations to a shared memory location that already includes stored content, encoding is performed as will be described in greater detail herein.

FIG. 3 also illustrates an exemplary approach to implementing encoding operations. According to aspects of the present invention, to implement an encoding operation at 154, the contents of the shared memory location are read at 158. The received data element is encoded with the contents read from the shared memory location to derive an encoded representation at 160 and the encoded representation is written back out to the shared memory location at 162 so as to overwrite the previously stored contents at the shared memory location. Any number of encoding techniques can be utilized as will be described in greater detail herein so long as a suitable decoding technique is also available to recover the previously stored contents and the received data element that were encoded into the encoded representation.

Figure 4:
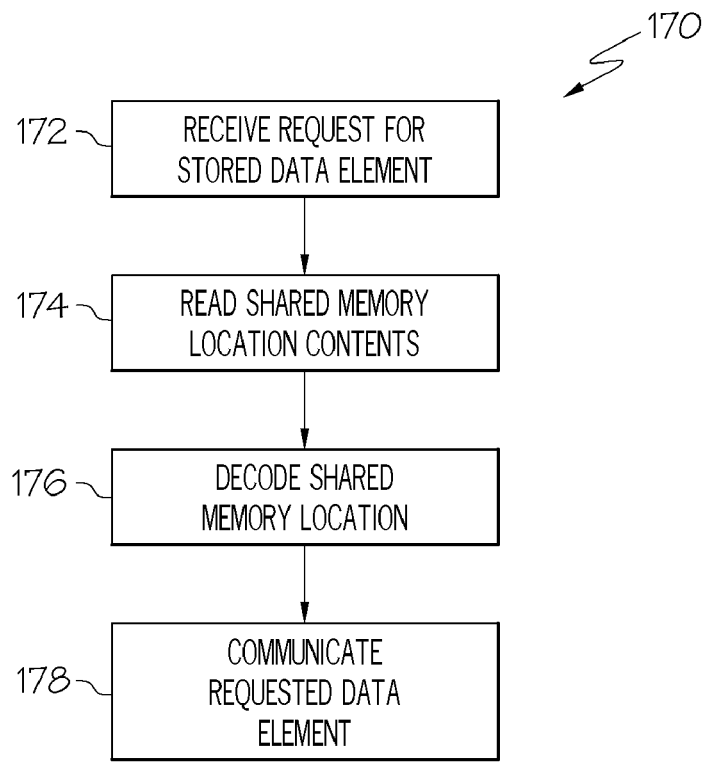
FIG. 4 is a flow chart illustrating a method for managing memory transactions such as read operations using memory stacking according to various aspects of the present invention.

Referring to FIG. 4, a flow chart illustrates a method 170 that describes a general approach for managing memory transactions such as read operations using memory stacking. For example, if only a single write operation has been performed to the corresponding shared memory location, then there may be no need to decode the memory contents. However, if the contents of the shared memory location comprise an encoded representation, then an appropriate decoding operation should be preformed. At some subsequent time after at least one write operation, a request is received at 172 for a data element that has previously been encoded into a shared memory location. The contents of the shared memory location are read out at 174 and are decoded at 176 to recover the requested data element. Decoding operations are described in greater detail herein. Once recovered, the requested data element is communicated at 178, e.g., to the virtual machine 108 associated with the requested data.

Figure 5:
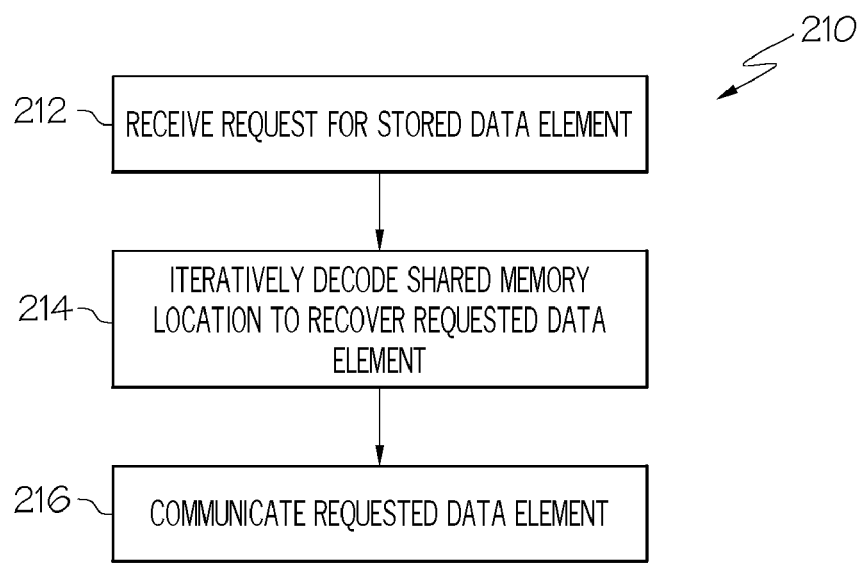
FIG. 5 is a flow chart illustrating a method of decoding stacked memory according to various aspects of the present invention.

Referring to FIG. 5, a flow chart illustrates an exemplary method 210 to recover an encoded data element from a shared memory location. A request is received at 212 for a data element that has been encoded and stored in a shared memory location. The shared memory location is iteratively decoded until the requested data element is recovered at 214 and the requested data element is communicated at 216.

With reference back to FIG. 3, as an illustrative example, a sequence of write operations to a shared memory location may be performed as follows. A first virtual machine 108 may communicate a first request to the virtual manager 110 to write a first data element to a shared memory location. In response thereto, the first data element is written to the shared memory location. Since it's the first data element written to the shared memory location in this example, there is no need to encode the value of the data element. Alternatively, the first data element may be encoded to simplify the algorithms implementing the method. If a request is received for the data element, e.g., by the first virtual machine 108, the first data element is read out from the shared memory location and is communicated to the requester, e.g., the first virtual machine. Alternatively, where the first data element is encoded, then the memory contents are read out, the first data element is decoded from the memory contents and the decoded value is communicated back to the first virtual machine.

However, if a second virtual machine communicates a second data element to the virtual manager for writing to the same shared memory location, then the shared memory location is read out to obtain the first data element. The first data element is encoded with the second data element to derive an encoded representation and the encoded representation is written back out to the shared memory location so as to overwrite the previously stored content. The above process repeats as necessary for each virtual machine that writes to the same shared memory location. As such, assuming there are N virtual machines 108 supported by a corresponding processing device 102A, there may be as many as N data elements encoded into a given shared memory location.

In this example, where there are as many as N different data elements encoded into the same shared memory location, it is likely that a requested data element is going to be in some encoded form at the time a request is made to recover the data element from the shared memory location. As such, the virtual manager 110 may include, e.g., within a virtual manager environment, the ability to manage and maintain the encoding and decoding of the shared memory locations. Thus, if the virtual manager 110 receives a read request from the ith virtual machine, the virtual manager 110 knows how many decode operations are required to recover the corresponding requested data element. Examples of methods for recovering data elements are described in greater detail below.

Figure 6:
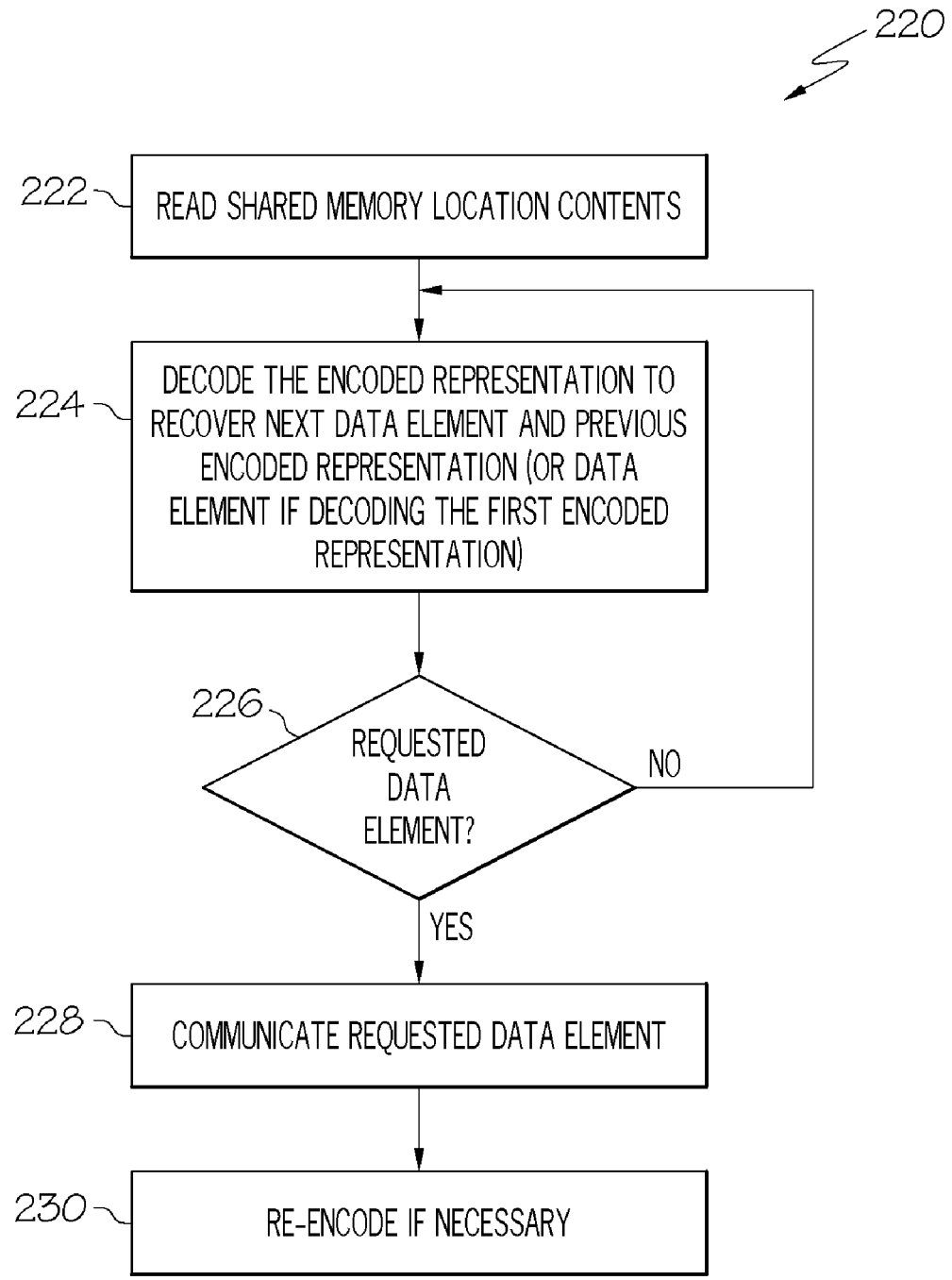
FIG. 6 is a flow chart illustrating a method of decoding stacked memory according to various aspects of the present invention.

Referring to FIG. 6, a flow chart illustrates a more detailed exemplary method 220 for iteratively decoding a shared memory location to recover a previously encoded data element according to various aspects of the present invention. To iteratively recover a previously encoded data element, the shared memory location is read out at 222. The contents are then decoded at 224 to recover a previously written data element and previous encoded representation. If the requested data element was recovered at 226, then the requested data element is communicated at 228. Otherwise, the process iteratively repeats by looping back to 224. In this regard, the recovered data element that was not the requested data element is not needed, and the previously encoded representation that was just recovered is now decoded to recover the next data element and corresponding encoded representation. The above process repeats until the desired data element is recovered.

An optional re-encoding operation may also be performed at 230. The re-encoding operation may be useful, for example, where a priority is to be changed, e.g., to relocate the order in which data elements are encoded and decoded to the shared memory location. The above process may also be useful for example, where a virtual machine over-writes an existing stored data value to the shared memory location with a second, different value. An example of priorities and updates will be described in greater detail herein.

Figure 7:
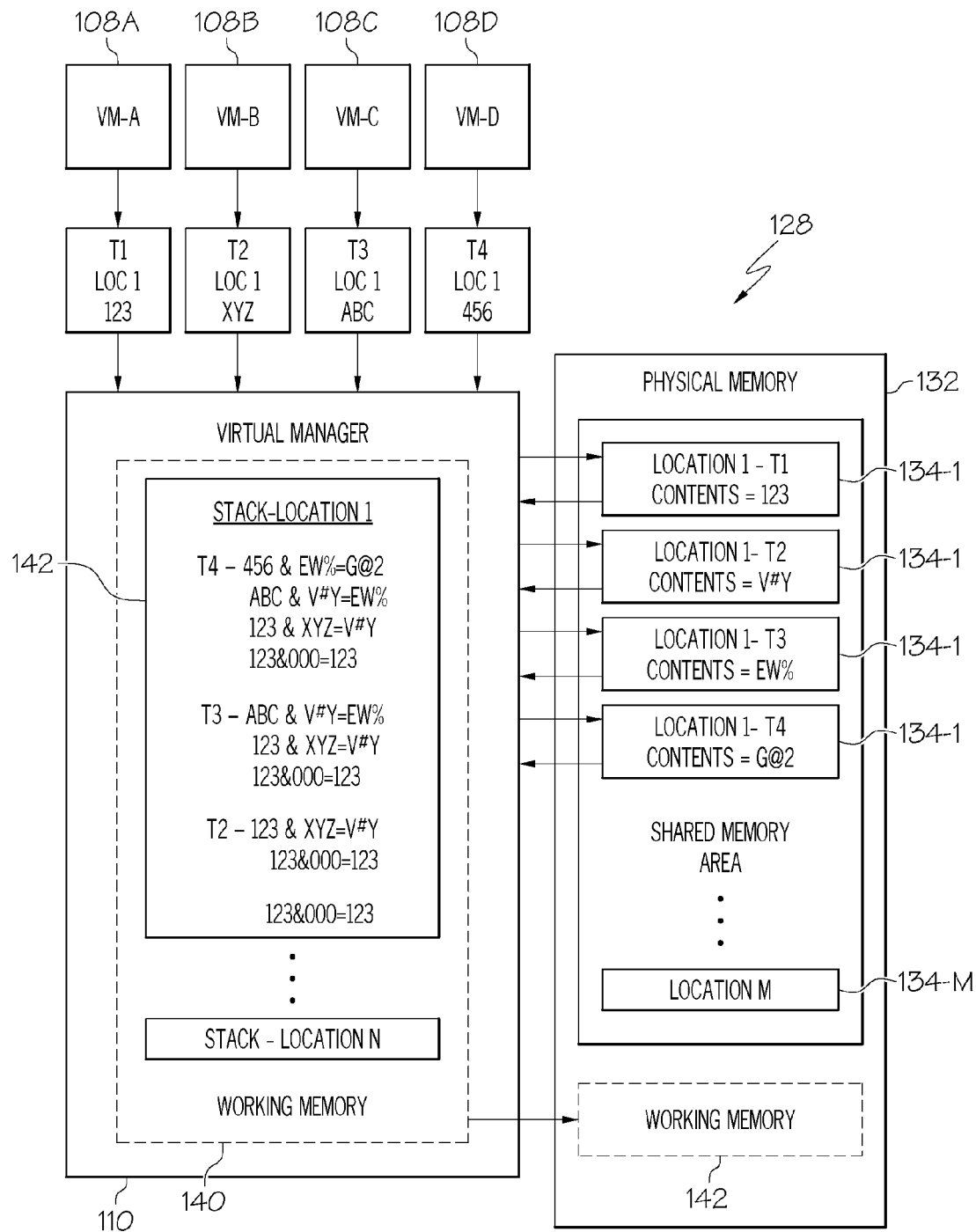
FIG. 7 is a block diagram of a system for implementing memory stacking at various snapshots in time, according to various aspects of the present invention.

With reference to FIG. 7, as an illustrative example, assume that a processing device 102A includes four virtual machines 108, further designated by a letter designation appended to its reference numeral, 108A, 108B, 108C and 108D. The example discussed with reference to FIG. 7 spans over a period of time. As such, the figure illustrates the state of the memory (physical memory and memory used by the virtual manager) as "snapshots" at various points in time, designated T1, T2, T3 and T4.

Assume that at time T1, the first virtual machine 108A communicates a request to the virtual manager 110 to write a first data element "123". Further, assume that the data element "123" is to be written to a shared memory location 1 within the shared memory area 132 of physical memory 128.

The address where the data element "123" is to be written can be determined by the first virtual machine 108A, the virtual manager 110 or another source, e.g., a separate memory management process. In the illustrative example, at time T1, there are no previous contents stored at shared memory location 1, so the virtual manager 110 facilitates writing of content "123" to shared memory location 1.

The virtual manager 110 may also implement an encoding scheme to simplify the algorithm implementation. In this regard, the first data element "123" is encoded with a null, blank or some other value, which is schematically illustrated as "000" in the Figure to derive the first encoded representation, also "123". The first encoded representation "123" is saved to the shared memory location 1, and a transaction is written to a stack 142 that provides the key to decode the first encoded representation.

According to aspects of the present invention, the virtual manager 110 may utilize the stack 142 to track the encoding of data elements. The transaction information that is pushed onto the stack 142 should allow the virtual manager 110 to identify and distinguish the stored data elements from their corresponding encoded representations. As such, the term "key" as used herein, is meant to be interpreted broadly to include any information that directly or indirectly enables an associated encoded representation to be decoded. Thus, in the current example, the stack 142 is updated to reflect a key, i.e., information that will enable the first encoded representation to be decoded into its parts (123=123&000).

At some point between times T1 and T2, if the first virtual machine 108A desires to retrieve the contents at location 1, the virtual manager 110 may simply read shared memory location 1 and convey the contents ("123" in this example) back to the first virtual machine 108A if no encoding was performed. Alternatively, if the stored content is an encoded representation, the virtual manager 110 pops the first entry off the stack 142. The virtual manager then decodes the retrieved memory contents based upon a key derived from the transaction data popped off the stack 142 to recover the first data element "123".

For purpose of illustration, assume that at time T2, the second virtual machine 108B communicates a request to the virtual manager 110 to write a second data element "XYZ" to memory. Further, assume that the second data element "XYZ" is to be written to the shared memory location 1. If such a write operation is permitted, the previously stored content "123" associated with virtual machine 108A would be overwritten. With reference back to the flow charts of FIGS. 3-6 generally, to address the above scenario, the virtual manager 110 implements virtual memory stacking.

To perform virtual memory stacking, the virtual manager 110 reads the contents from shared memory location 1. In this example, the virtual manager reads the value "123". The received data element is then encoded with the contents read out from the shared memory location. Thus, the data element "XYZ" is encoded with respect to the shared memory content "123" to produce a second encoded representation "V#Y". The second encoded representation is then written back out to the shared memory location 1 so as to overwrite the previously stored value of "123". Moreover, the stack 142 is updated with another transaction to reflect the second encoded representation (123&XYZ=V#Y). As such, there are now two entries on the stack 142 in this illustrative example. As noted above, there may be only a single entry on the stack 142 if the first data element is written directly to memory.

Between times T2 and T3, if either the first virtual machine 108A or the second virtual machine 108B requires their content, a request is issued to the virtual manager 110 to recover the desired data element. With reference back to FIGS. 3-6, the content of the shared memory location is read to retrieve the second encoded representation, i.e., the memory contents "V#Y". The virtual manager 110 then decodes the second encoded representation to recover the first data element "123" associated with the first virtual machine 108A and the second data element "XYZ" associated with the second virtual machine 108B. For example, the virtual manager 110 may read the top of the stack 142 to determine the key to decode the second encoded representation. If the second data element "XYZ" was the requested data element, then the requested data element is communicated to the second virtual machine 108B. If the first data element was requested by the first virtual machine 108A, and if the first data element "123" was also further encoded, the virtual manager 110 reads the next transaction on the stack 142 to obtain the key to decode the first encoded representation to recover the first data element "123". The first data element may then be communicated to the first virtual machine 108A.

Keeping with the above example, assume at time T3, the third virtual machine 108C communicates a request to the virtual manager 110 to write a third data element "ABC" to memory. Further, assume that the third data element "ABC" is to be written to the same shared memory location 1 as was used to store the first encoded representation "123" at time T1 and the second encoded representation "V#Y" at time T2. The virtual manager 110 reads the contents of shared memory location 1 to obtain the second encoded representation "V#Y". The third data element "ABC" is encoded with the second encoded representation "V#Y" to derive a third encoded representation "EW %" and the third encoded representation is written to shared memory location 1, thus overwriting the second encoded representation "V#Y". Moreover, a transaction is pushed onto the stack 142 that identifies a key to decode the third encoded representation. As schematically represented by the stack 142, at time T3, there are now three entries on the stack 142.

After time T3, the virtual manager 110 would be unable to directly recover the first data element "123" from shared memory location 1 as it is now buried in multiple levels of encoding. Thus, as an illustrative example, assume that between time T3 and time T4, the first virtual machine 108A wants to read the value of the shared memory location 1. The virtual manager 110 may iteratively decode the current contents of shared memory location 1 until the requested data element ("123" in this example) is recovered. In this regard, the virtual manager 110 may decode down the stack 142 to recover the appropriate key for each iteration of decoding to be performed. The virtual manager 110 reads the shared memory contents at location 1 to obtain the third encoded representation "EW %". The virtual manager 110 pops the first transaction off the stack 142 and uses the associated key to decode the third encoded representation to recover "ABC", the data element of the third virtual machine 108C and "V#Y", the second encoded representation. Neither recovered value is the desired data element written by the first virtual machine 108A.

As such, the virtual manager 110 iteratively pops the next transaction off the stack 142. The virtual manager 110 uses the key popped off the stack 142 to decode the second encoded representation of V#Y. The virtual manager 110 thus decodes the second encoded representation to recover the first data element "123" and the second data element "XYZ". If the first data element was also encoded, the virtual manager pops the next transaction from the stack 142 to obtain the key necessary to decode the first encoded representation, which is used to recover the first data element "123"

Assume that at time T4, the fourth virtual machine 108D communicates a request to the virtual manager 110 to write a fourth data element "456" to memory. Further, assume that the fourth data element "456" is to be written to the same shared memory location 1 as was used to store the first data element "123" at time T1, the first encoded representation "V#Y" at time T2, and the second encoded representation "EW %" at time T3. The virtual manager 110 receives the fourth data element "456" from the fourth virtual machine 108D. The virtual manager 110 reads the contents of shared memory location 1 to obtain the third encoded representation "EW %". The fourth data element "456" is encoded with the third encoded representation "EW %" to derive a fourth encoded representation "G@2" and the fourth encoded representation is written to shared memory location 1, thus overwriting the third encoded representation "EW %". Moreover, a transaction is written to the stack 142 that provides the key to decode the fourth encoded representation. As schematically represented by the stack 142, at time T4, there are now transaction entries on the stack 142 corresponding to the fourth encoded representation "G@2", the third encoded representation "EW %", the second encoded representation "V#Y" and the first encoded representation "123".

At snapshot time T4, the virtual manager 110 would be unable to directly recover the first data element "123", the second data element "XYZ", the third data element "ABC" or the fourth data element "456" from shared memory location 1 as they are now buried in one or more levels of encoding. However, upon request, e.g., as requested by the corresponding virtual machine 108, the virtual manager 110 can decode down the stack 142 in a manner analogous to that described more fully herein to recover the requested data element.

In the illustrated example, there are four virtual machines. As such, the stack may be required to store up to four transactions. In the illustrative example described with reference to FIG. 7, the fourth virtual machine 108D was the last to write to the shared memory location 1, so its transaction decoding key is at the top of the stack 142. The third virtual machine 108C was next to last to write to the shared memory location 1, so its transaction decoding key is second on the stack 142. The second virtual machine 108B was second to write to the shared memory location 1, so its transaction decoding key is second to last on the stack 142 and the first virtual machine 108A was the first to write to shared memory location 1, so its decoding key is at the bottom of the stack 142.

According to aspects of the present invention, assume at a new time T5, the first virtual machine 108A were to write a second value to the first shared memory location 1, e.g., "UVW". Since the first virtual machine 108A is at the bottom of the stack 142, the virtual manager reads down the stack to decode the each previously written data element. The previous value "123" of the data element associated with the first virtual machine 108A is replaced with the new value "UVW". The virtual manager then re-encodes back up the stack. The new value of the first data element is encoded into the new first encoded representation, e.g., "UVW". The first encoded representation is encoded with the second data element to derive a new second encoded representation. Thus, "UVW"&"XYZ"="R$E". The second encoded representation is encoded with the third data element to derive a new third encoded representation. Thus "ABC"&"R$E"="I*U". The third encoded representation is encoded with the fourth data element to derive a new fourth encoded representation. Thus "456"&"I*U"="G^H". The fourth encoded representation "G^H" is then written to the first shared memory location overwriting the previous value "G@2". Moreover, any suitable updates are also performed to the transactions contained on the stack 142.

In the illustrative example, the virtual manager decodes down the stack 142 in order to recover the first data element "123" at the request of the first virtual machine 108A. To perform this operation, the virtual manager 110 may need to temporarily store values of decoded data elements and/or encoded representations. As such, the virtual manager 110 may include a working memory 140, which may be within the hardware and/or software environment of the virtual manager 110. As an alternative arrangement, the virtual manager 110 may utilize a designated area 142 of the physical memory 128 or some of the storage means for performing memory management operations.

Moreover, any number of techniques may be implemented to perform the encoding of the data values. Still further, the type of encoding and decoding may vary depending upon the number of virtual machines and other relevant factors. As a few illustrative examples, if there are relatively few virtual machines, a first encoding scheme may be implemented that is optimized for a small number of operations. Alternatively, if there are a large number of virtual machines, e.g., hundreds or thousands of virtual machines 108, then a different encoding scheme may be more appropriate to address the potentially large number of encoding and decoding operations required.

Similarly, the amount of physical storage space used to define a "shared memory location" will likely vary depending upon the number of virtual machines. As an example, as shown, the virtual manager was able to compute the encoded representation using the same number of bytes as the associated data element. However, if there were a large number of virtual machines, e.g., hundreds or thousands, then the shared memory space required to store an encoded value that includes potentially every virtual machine may be relatively greater than the number of bytes of an associated one of the data elements. Moreover, the type of encoding may be based upon the type of data corresponding to the written data elements. For example, if the data elements are all alpha, numeric, alpha-numeric, etc., a different encoding algorithm may be selected. Still further, the virtual manager may dynamically manage the shared memory location, e.g., by modifying the algorithms, shared memory location size, etc. based upon the number of virtual machines 108 that are brought on line/into existence.

Also, the virtual manager 110 may support an independent stack for each shared memory location. In this regard, the size of each shared memory location may depend, for example, upon the size of the available sharable memory area 134, the encoding scheme implemented, the type of data to be written to memory, and other factors. Moreover, where multiple stacks are implemented, the position of each virtual machine 108 within that stack may be predetermined, fixed, based upon an order or priority given to one virtual machine 108 over the others, etc. (globally, on a per stack basis or per group of stacks basis). Similarly, the order of each virtual machine within each stack may be dynamic, e.g., based upon the order in which data is written to that particular stack.

Still further, dynamic prioritization may be utilized to enhance performance of each stack. For example, memory usage, assigned priority, speed requirements, etc. may be used to dynamically assign and adjust the order of each virtual machine 108 within the stacks so that targeted virtual machines 108 realize the fastest stack accesses. Still further, prioritization and other orderings may be implemented globally, e.g., the same order for all stacks. Still further, the prioritization and other orderings may be implemented locally, e.g., directed to a single stack 142 or group of stacks.

Referring back to FIG. 2, the virtual manager 110 may include a tuning aspect. For example, tuning parameters may be received, e.g., via a tuning input 144 that are used to configure the performance of the virtual manager 110. Thus, as an example, the virtual manager may receive inputs that designate the number of anticipated virtual machines 108. Based upon this tuning input, the virtual manager 110 may allocate a stack size, select an encoding scheme, determine the size of each shared memory location, etc. Still further, the tuning input 144 may be utilized to receive priority assignments or other data that enables the virtual manager 110 to manage the virtual machines as set out more fully herein. Regardless, the various aspects of the present invention utilize the fast memory access times compared to the relatively slow access times of hard drive storage.

Figure 8:
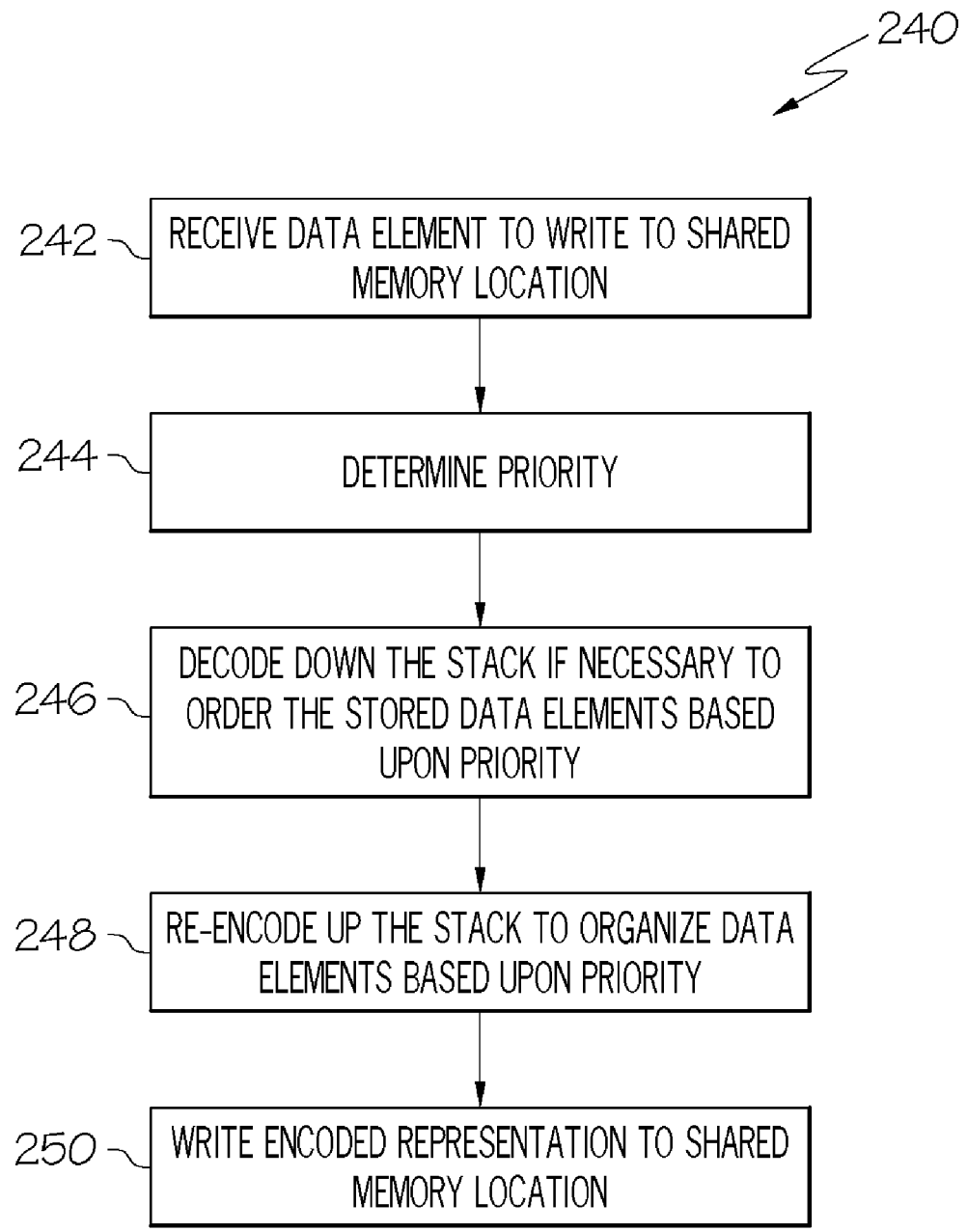
FIG. 8 is a flow chart illustrating a method of assigning and implementing a priority stacked data elements according to various aspects of the present invention.

Referring to FIG. 8, a flow chart illustrates a method 240 to implement priority to certain virtual machines 108. A data element is received at 242 to write to a shared memory location. A determination of priority is made at 244. If the data element to be written cannot be placed at the top of the stack 142, e.g., due to the priority of the data element or the priority of previously encoded data elements, then the stack 142 may be decoded at least partially to decode data elements sufficient to re-encode based upon the priority or priorities of the data elements at 246. When the data elements have been properly decoded, the process may re-encode up the stack 142 to organize the data elements within the stack based upon their priority at 248. Once the data elements have been encoded up the stack, the last encoded representation is written to the shared memory location at 250. This process may be implemented, for example, in a manner similar to that described herein with regard to updating a data value written by a virtual machine to a shared memory location.

Figure 9:
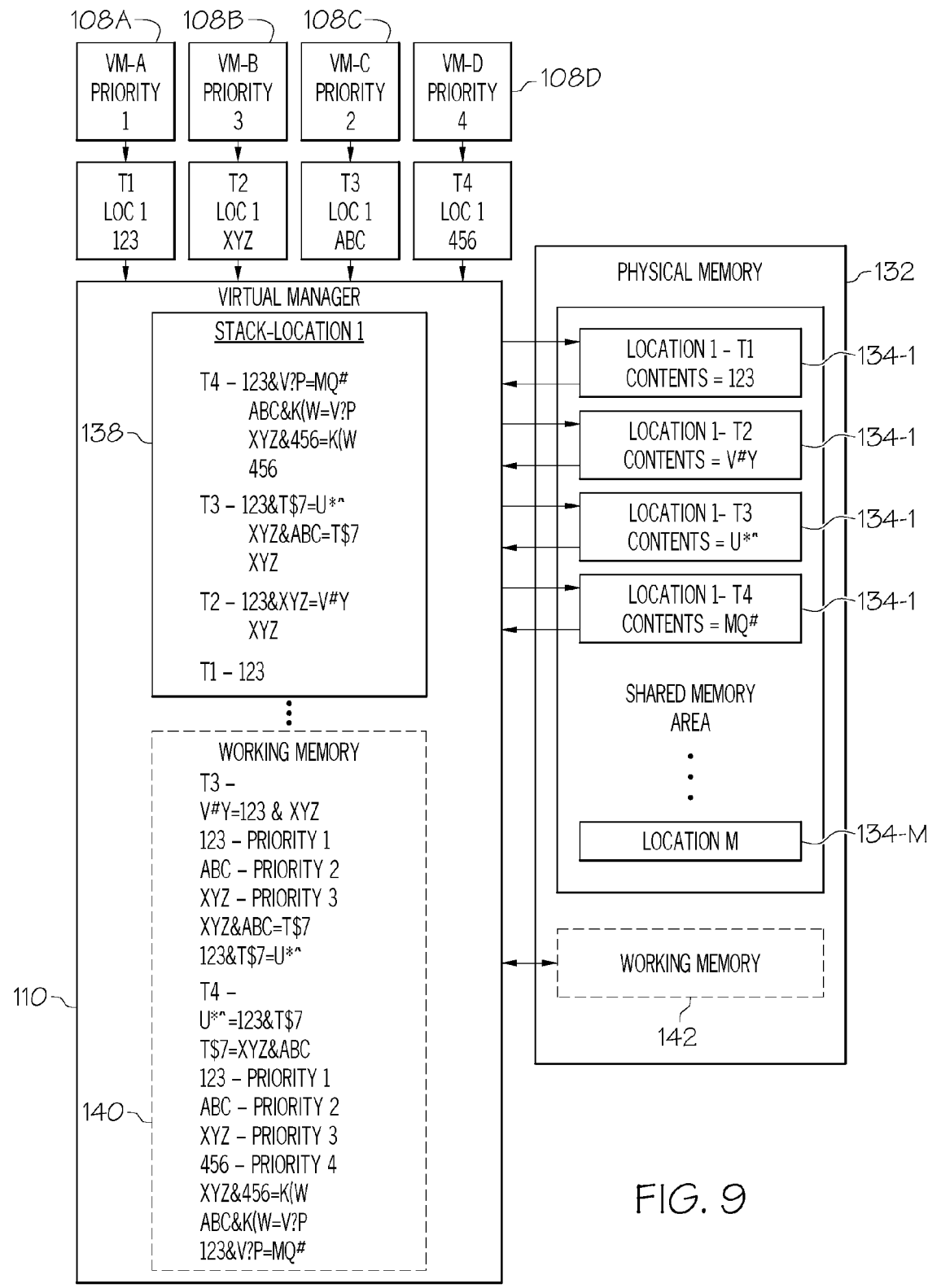
FIG. 9 is a block diagram of a system for implementing prioritized memory stacking at various snapshots in time, according to various aspects of the present invention.

Referring to FIG. 9, an example is given where each virtual machine 108 is assigned a priority. In the illustrative example, the first virtual machine 108A has a priority of "1", the second virtual machine has a priority of "3", the third virtual machine has a priority of "2" and the fourth virtual machine has a priority of "4". As noted more fully herein, these priorities may be dynamically changing, e.g., based upon memory usage, or they may be statically assigned.

Assume that at time T1, the first virtual machine communicates a request to the virtual manager 110 to write a first data element "123" to memory. In response thereto, the virtual manager 110 encodes and writes a first encoded representation "123" to a first shared memory location. In this example, the first encoded representation is illustrated as being equal to the first data value because it was assumed that the first shared memory location contained a null value. At time T2, the second virtual machine communicates a request to the virtual manager 110 to write a second data element "XYZ" to memory. The second data element has a priority of 3, which is less than the priority of the first data element. As such, the virtual manager 110 reads the first shared memory location contents, and then processes down the stack to recover the first data element "123". The virtual manager 110 then encodes back up the stack in the order of the priority.

The virtual manager encodes the second data element "XYZ". Again, since the first memory location started out at a null set, the "new" first encoded representation is "XYZ". It could be any encoded value depending upon the state of the first shared memory contents at the time of the first write operation. The virtual manager then encodes the first data element "123" with the encoded representation "XYZ" to derive a second encoded representation "V#Y". The virtual manager 110 then stores the second encoded representation in the first shared memory location, thus overwriting the first encoded representation "XYZ". Thus, the priority of the first data element is preserved in the encoding scheme. Moreover, any suitable updates may be made to the stack 142 so that the stack 142 reflects the current state of data elements stored at the corresponding first shared memory location.

At time T3, the third virtual machine 108C communicates a request to the virtual manager 110 to write a third data element "ABC" to memory. The virtual manager 110 reads the first shared memory location to read the first encoded representation "V#Y". The third data element "ABC" has a priority of 2, which supersedes the priority of the second data element "XYZ". However, the priority of the first data element "123" supersedes the priority of both the second data element "XYZ" and the third data element "ABC". As such, the virtual manager 110 needs to place the first data element "123" at the top of the stack 142 and the third data element "ABC" in the middle of the stack.

As an illustrative example, the virtual manager 110 may decode down the stack 142 to decode "V#Y" to recover the first data element "123" and the second data element "XYZ" as schematically illustrated in the working memory 140 at time T3. No further decoding may be required since the second data element "XYZ" has a lower priority than the third data element "ABC". Once the data elements are sorted or otherwise logically organized based upon priority, the virtual manager 110 may encode the data elements based upon the derived priority back up the stack. In the illustrative example, the virtual manager 110 may encode "ABC" & "XYZ" to derive a new second encoded representation "T$7". The virtual manager next encodes "123" and "T$7" to derive a third encoded representation "U*A". The third encoded representation "U*^" is written to shared memory location 1. Moreover, any suitable updates may be made to the stack 142 so that the stack 142 reflects the current state of data elements stored at the corresponding first shared memory location.

At time T4, the fourth virtual machine 108D communicates a request to the virtual manager 110 to write a fourth data element "456" to memory. The virtual manager 110 reads the first shared memory location to read the third encoded representation "U*^". The fourth data element "456" has a priority of 4, which is the lowest priority of the previously written data elements in this illustrative example. As such, the virtual manager 110 must place the fourth data element at the bottom of the stack 142. As an illustrative example, the virtual manager 110 may decode down the stack 142 by decoding "U*^" to recover the first data element "123" and the second encoded representation "T$7". The virtual manager 110 may then decode further down the stack 142 by decoding "T$7" to recover the second data element "XYZ" and the third data element "ABC". The virtual manager 110 may also need to decode "XYZ" if it was also encoded, etc.

Once the data elements are sorted or otherwise logically organized based upon priority, the virtual manager 110 may encode the data elements back up the stack based upon the derived priority, as schematically illustrated in the working memory 140 at time T4. In the illustrative example, the virtual manager 110 may encode the lowest priority value first, i.e., the fourth data element "456". The virtual manager then encodes the two lowest priority data elements "XYZ" & "456" to derive a new encoded representation "K(W". The virtual manager 110 next encodes the next lowest priority "ABC" and the encoded representation "K(W" to derive a new encoded representation "V?P". The virtual manager 110 next encodes the remaining data element "123", which has the highest priority, with the encoded representation "V?P" to derive an encoded representation "MQ#", which is written to shared memory location 1.

The above process of maintaining priority within the stack is continued for updates and changes that each virtual machine 108 may make to the value of its content stored in the first shared memory location.

Figure 10:
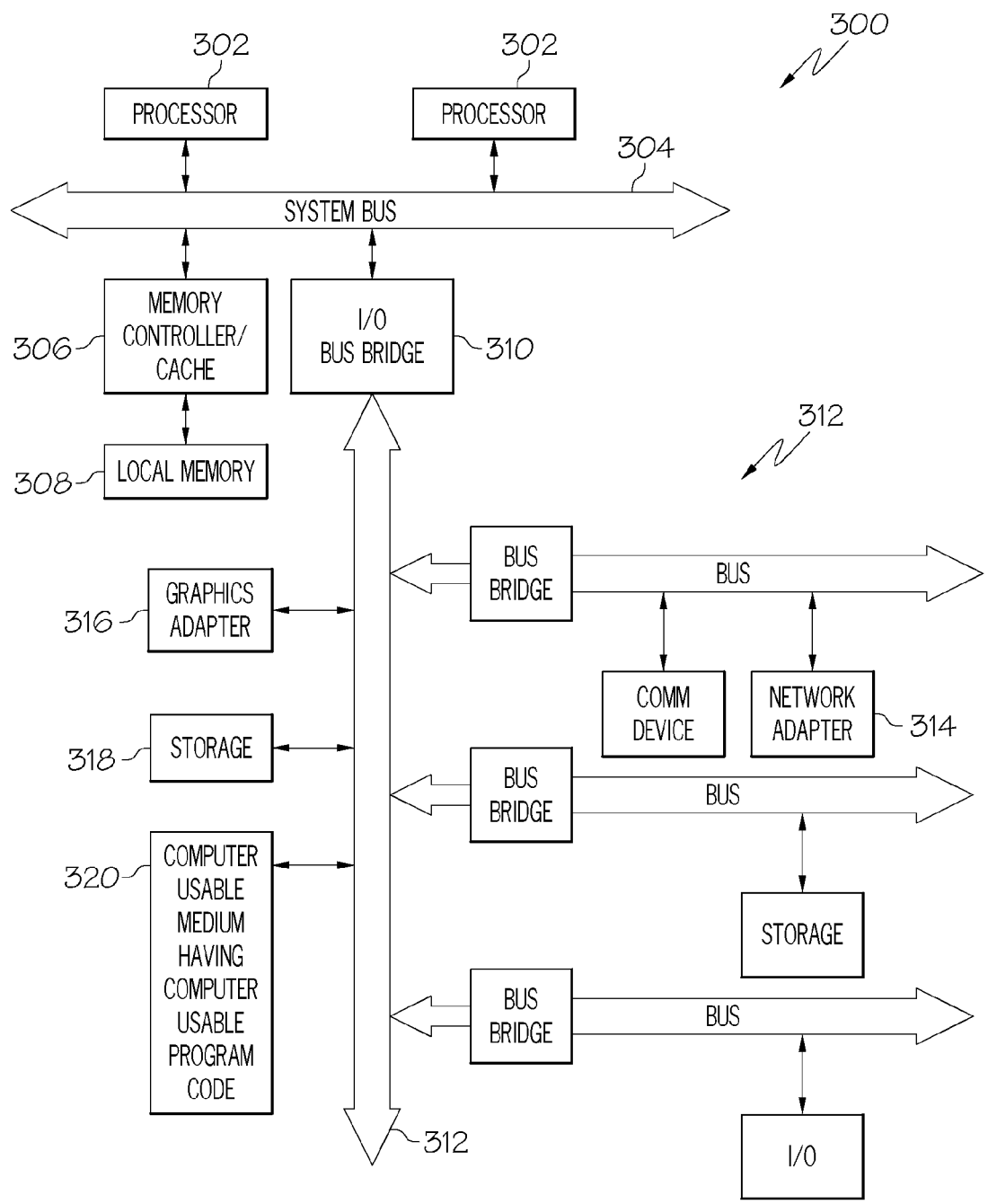
FIG. 10 is a block diagram of an exemplary computer system including a computer usable medium having computer usable program code embodied therewith, where the exemplary computer system is capable of implementing memory stacking at various snapshots in time, according to various aspects of the present invention.

Referring to FIG. 10, a block diagram of a data processing system is depicted in accordance with the present invention. Data processing system 300 may comprise a symmetric multiprocessor (SMP) system or other configuration including a plurality of processors 302 connected to system bus 304. Alternatively, a single processor 302 may be employed. Also connected to system bus 304 is memory controller/cache 306, which provides an interface to local memory 308. An I/O bus bridge 310 is connected to the system bus 304 and provides an interface to an I/O bus 312. The I/O bus may be utilized to support one or more network adapters 314, as well as optionally, one or more buses and corresponding devices, such as bus bridges, input output devices (I/O devices), storage, etc.

Also connected to the I/O bus may be devices such as a graphics adapter 316, storage 318 and a computer usable medium 320 having computer usable program code embodied thereon. The computer usable program code may be utilized, for example, to implement the virtual manager, virtual stacking techniques and/or other features and aspects of the various aspects of the present invention as described more fully herein.

The data processing system may be, for example, an IBM RS/6000® system, a product of International Business Machines Corporation in Armonk, N.Y., running the Advanced Interactive Executive AIX® operating system. An object oriented programming system such as Java® may run in conjunction with the operating system and provides calls to the operating system from Java programs or applications executing on the data processing system. ("RS/6000" and "AIX" are registered trademarks of IBM in the United States, other countries, or both. "Java" is a registered trademark of Oracle Corporation in the United States, other countries, or both.)

The various aspects of the present invention may be embodied as systems, computer-implemented methods and computer program products. Also, various aspects of the present invention may take the form of an entirely hardware embodiment, an entirely software embodiment (including software, firmware, micro-code, etc.) or an embodiment combining software and hardware, wherein the embodiment or aspects thereof may be generally referred to as a "circuit," "component" or "system." Furthermore, the various aspects of the present invention may take the form of a computer program product on a computer-usable storage medium having computer-usable program code embodied in the medium or a computer program product accessible from a computer-usable or computer-readable medium providing program code for use by or in connection with a computer or any instruction execution system.

The software aspects of the present invention may be stored, implemented and/or distributed on any suitable computer usable or computer readable medium(s). For the purposes of this description, a computer-usable or computer readable medium can be any apparatus that can contain, store, communicate, propagate, or transport the program for use by or in connection with the instruction execution system, apparatus, or device. The computer program product aspects of the present invention may have computer usable or computer readable program code portions thereof, which are stored together or distributed, either spatially or temporally across one or more devices. A computer-usable or computer-readable medium may comprise, for example, an electronic, magnetic, optical, electromagnetic, infrared, or semiconductor system, apparatus, device, or propagation medium. As yet further examples, a computer usable or computer readable medium may comprise cache or other memory in a network processing device or group of networked processing devices such that one or more processing devices stores at least a portion of the computer program product. The computer-usable or computer-readable medium may also comprise a computer network itself as the computer program product moves from buffer to buffer propagating through the network. As such, any physical memory associated with part of a network or network component can constitute a computer readable medium.

More specific examples of the computer usable or computer readable medium comprise for example, a semiconductor or solid state memory, magnetic tape, an electrical connection having one or more wires, a swappable intermediate storage medium such as floppy drive or other removable computer diskette, tape drive, external hard drive, a portable computer diskette, a hard disk, a rigid magnetic disk, a random access memory (RAM), a read-only memory (ROM), an erasable programmable read-only memory (EPROM or Flash memory), a portable compact disc read-only memory (CD-ROM), a read/write (CD-R/W) or digital video disk (DVD), an optical fiber, disk or storage device, or a transmission media such as those supporting the Internet or an intranet. The computer-usable or computer-readable medium may also comprise paper or another suitable medium upon which the program is printed or otherwise encoded, as the program can be captured, for example, via optical scanning of the program on the paper or other medium, then compiled, interpreted, or otherwise processed in a suitable manner, if necessary, and then stored in a computer memory. The computer-usable medium may include a propagated data signal with the computer-usable program code embodied therewith, either in baseband or as part of a carrier wave or a carrier signal. The computer usable program code may also be transmitted using any appropriate medium, including but not limited to the Internet, wire line, wireless, optical fiber cable, RF, etc.

A data processing system suitable for storing and/or executing program code may include at least one processor coupled directly or indirectly to memory elements, e.g., through a system bus or other suitable connection. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Computer program code for carrying out operations of the present invention may be written in any suitable language, including for example, an object oriented programming language such as Java, Smalltalk, C++ or the like. The computer program code for carrying out operations of the present invention may also be written in conventional procedural programming languages, such as the "C" programming language, or in higher or lower level programming languages. The program code may execute entirely on a single processing device, partly on one or more different processing devices, as a stand-alone software package or as part of a larger system, partly on a local processing device and partly on a remote processing device or entirely on the remote processing device. In the latter scenario, the remote processing device may be connected to the local processing device through a network such as a local area network (LAN) or a wide area network (WAN), or the connection may be made to an external processing device, for example, through the Internet using an Internet Service Provider.

The present invention is described with reference to flowchart illustrations and/or block diagrams of methods, apparatus systems and computer program products according to embodiments of the invention. It will be understood that each block of the flowchart illustrations and/or block diagrams, and combinations of blocks in the flowchart illustrations and/or block diagrams may be implemented by system components or computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention may be practiced on any form of computer system, including a stand alone computer or one or more processors participating on a distributed network of computers. Thus, computer systems programmed with instructions embodying the methods and/or systems disclosed herein, or computer systems programmed to perform various aspects of the present invention and storage or storing media that store computer readable instructions for converting a general purpose computer into a system based upon the various aspects of the present invention disclosed herein, are also considered to be within the scope of the present invention. Once a computer is programmed to implement the various aspects of the present invention, including the methods of use as set out herein, such computer in effect, becomes a special purpose computer particular to the methods and program structures of this invention. The techniques necessary for this are well known to those skilled in the art of computer systems.

The flowchart and block diagrams in the Figures illustrate the architecture, functionality, and operation of possible implementations of systems, methods and computer program products according to various embodiments of the present invention. In this regard, one or more blocks in the flowchart or block diagrams may represent a component, segment, or portion of code, which comprises one or more executable instructions for implementing the specified logical function(s). In some alternative implementations, the functions noted in the blocks may occur out of the order noted in the figures. For example, two blocks shown in succession may, in fact, be executed substantially concurrently or in the reverse order.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

Having thus described the invention of the present application in detail and by reference to embodiments thereof, it will be apparent that modifications and variations are possible without departing from the scope of the invention defined in the appended claims.

What is claimed is:

1. A method of utilizing physical memory in a virtual machine environment, comprising:
   receiving a data element for storage to a shared memory location;
   writing to the shared memory location by:
      reading the shared memory location contents;
      encoding the received data element with the shared memory location contents to derive an encoded representation that represents both the received data element and the shared memory location contents; and
      writing the encoded representation to the shared memory location so as to overwrite the previous shared memory location contents;
   receiving a request for a desired data element encoded into the shared memory location;
   decoding the shared memory location contents until the desired data element is recovered; and
   communicating the requested data element.

2. The method according to claim 1, further comprising:
   initially storing at least one of the first data element or an encoded representation of the first data element at the shared memory location.

3. The method according to claim 2, wherein:
   receiving a data element for storage at a shared memory location comprises receiving a second data element for storage at the shared memory location; and
   encoding the received data element with the shared memory location contents comprises encoding the second data element with the shared memory location contents to derive the encoded representation that represents both the received second data element and the shared memory location contents.

4. The method according to claim 3, wherein:
   receiving a request for a desired data element encoded into the shared memory location further comprises receiving a request for a selected one of the first data element or the second data element; and
   decoding the shared memory location contents until the desired data element is recovered further comprises decoding the shared memory contents to recover the first data element if the first data element is requested, and decoding the second data element if the second data element is requested.

5. The method according to claim 3, wherein:
   receiving a data element for storage at a shared memory location further comprises receiving a third data element for storage at the shared memory location;
   reading the shared memory location contents further comprises reading the encoded representation of the first data element and second data element from the shared memory location;
   encoding the received data element with the shared memory location contents comprises encoding the third data element with the encoded representation to derive a new encoded representation that represents both the received third data element and the shared memory location contents;
   receiving a request for a desired data element encoded into the shared memory location comprises receiving a request for a selected one of the first data element, the second data element, or the third data element; and
   decoding the shared memory location contents until the desired data element is recovered comprises iteratively decoding the shared memory location contents to recover the first data element if the first data element is requested, decoding the second data element if the second data element is requested, or decoding the shared memory location contents to recover the third data element if the third data element is requested.

6. The method according to claim 1, further comprising utilizing a stack to track each time a different received data element is encoded with the shared memory location contents.

7. The method according to claim 6, further comprising:
   reordering the encoding of at least one of the received data elements within the shared memory location contents when a priority of any of the received data elements changes.

8. The method according to claim 6, wherein writing to the shared memory location further comprises implementing a predetermined priority scheme, comprising:
   decoding at least partially down the stack to decode received data elements;
   re-ordering the data elements relative to the stack; and
   re-encoding the received data elements up the stack so as to write at least one data element at a different stack location.

9. A method of utilizing physical memory in a virtual machine environment, comprising:
   associating a plurality of virtual machines with a physical memory having a shared memory area;
   receiving a first data element from a first virtual machine of the plurality of virtual machines;
   performing a first write operation to the shared memory location by:
      reading the shared memory location content;
      encoding the first data element with the shared memory location content to derive a first encoded representation that represents both the first data element and the shared memory location content; and
      writing the first encoded representation to the shared memory location so as to overwrite the previous memory content;
   updating a stack to track the first encoded representation;
   receiving a second data element from a second virtual machine of the plurality of virtual machines that is different from the first virtual machine for storage to the shared memory location;
   performing a second write operation to the shared memory location by:

reading the first encoded representation from the shared memory location;
encoding the second data element with the first encoded representation to derive a second encoded representation that represents both the second data element and the first encoded representation; and
writing the second encoded representation to the shared memory location so as to overwrite the first encoded representation;
updating the stack to track the second encoded representation;
receiving a request for a desired data element encoded into the shared memory location;
decoding the shared memory location content until the desired data element is recovered;
associating the desired data element with a corresponding virtual machine that communicated the desired data element for storage at the shared memory location; and
communicating the requested data element to the corresponding virtual machine.

10. The method according to claim 9, further comprising:
receiving a third data element from a third virtual machine of the plurality of virtual machines for storage to the shared memory location;
performing a third write operation to the shared memory location by:
reading the encoded representation from the shared memory location;
encoding the third data element with the encoded representation to derive a new encoded representation that represents both the third data element and the encoded representation read from the shared memory location; and
writing the new encoded representation to the shared memory location so as to overwrite the previous encoded representation; and
updating the stack to track the new encoded representation.

11. The method according to claim 9, further comprising:
receiving a third data element for storage to a shared memory location; and
performing a third write operation to the shared memory location so as to implement a predetermined priority scheme by:
decoding at least partially down the stack to decode received data elements;
re-ordering the data elements relative to the stack; and
re-encoding the received data elements up the stack so as to write at least one data element at a different stack location.

12. The method according to claim 11, further comprising identifying the predetermined priority scheme by assigning a priority in the stack to certain ones of the plurality of virtual machines, wherein data elements written by the certain ones of the plurality of virtual machines to the shared memory location are assigned higher positions within the stack than remaining ones of the virtual machines that write data elements to the shared memory location.

13. The method according to claim 11, further comprising:
identifying the predetermined priority scheme based upon identifying memory usage access of the plurality of virtual machines; and
placing data elements from virtual machines within the stack based upon the identified usage access of the plurality of virtual machines.

14. The method according to claim 11, further comprising:
identifying the predetermined priority scheme based upon identifying a type of data in use; and
placing data elements from virtual machines within the stack based upon the identified type of data.

15. The method according to claim 9, further comprising:
performing an update to a value of a data element stored in the shared memory location by:
decoding down the stack to recover the associated data element;
updating the data element;
re-encoding up the stack based upon the new data element value; and
storing a final encoded representation to the shared memory location so as to overwrite the previously stored value.

16. A system for managing physical memory, comprising:
a physical processing device having a plurality of virtual machines executing thereon;
a physical memory having a shared memory area; and
a virtual manager configured to:
receive a data element for storage to the shared memory location;
write to the shared memory location by:
reading the shared memory location contents;
encoding the received data element with the shared memory location contents to derive an encoded representation that represents both the received data element and the shared memory location contents; and
writing the encoded representation to the shared memory location so as to overwrite the previous shared memory location contents;
utilize a stack to track each time a different received data element is encoded with the shared memory location contents;
receive a request for a desired data element encoded into the shared memory location;
decode the shared memory location contents until the desired data element is recovered; and
communicate the requested data element.

17. The system according to claim 16, wherein the virtual manager is further configured to decode down the stack to write a received data element to a lower stack position.

18. The system according to claim 16, wherein the virtual manager manipulates the stack in a virtual manager environment that includes both software and hardware to manage the stack.

19. The system according to claim 16, wherein the virtual manager is further configured to implement a priority scheme to position received data elements higher or lower within the stack.

20. The system according to claim 19, wherein the priority scheme is based upon a ranking of virtual machines.

* * * * *